(12) United States Patent
Kobiyama

(10) Patent No.: US 6,951,024 B2
(45) Date of Patent: Sep. 27, 2005

(54) OPTICAL DISK REPRODUCING APPARATUS AND REPRODUCING METHOD

(75) Inventor: Kiyoshi Kobiyama, Shirakawa (JP)

(73) Assignee: Denon, Ltd., Tokyo (JP)

( * ) Notice: Subject to any disclaimer, the term of this patent is extended or adjusted under 35 U.S.C. 154(b) by 349 days.

(21) Appl. No.: 10/229,531

(22) Filed: Aug. 28, 2002

(65) Prior Publication Data

US 2003/0095490 A1 May 22, 2003

(30) Foreign Application Priority Data

Nov. 22, 2001 (JP) ........................................ 2001-357551

(51) Int. Cl.⁷ ............................................. G11B 17/04
(52) U.S. Cl. ..................................................... 720/612
(58) Field of Search ........................ 369/77.11–77.21, 369/75.21, 191.1, 77.1, 77.2, 75.2, 191; 720/605, 612, 617, 619, 640, 690

(56) References Cited

U.S. PATENT DOCUMENTS

| | | | |
|---|---|---|---|
| 4,416,003 A | * | 11/1983 | Suzuki ........................ 720/603 |
| 4,539,668 A | | 9/1985 | Izumi et al. |
| 4,561,084 A | | 12/1985 | Satake et al. |
| 4,744,072 A | * | 5/1988 | Tamaki et al. ............... 720/612 |
| 5,187,700 A | * | 2/1993 | Yoon .......................... 720/612 |
| 5,805,554 A | * | 9/1998 | Suzuki et al. ............... 720/612 |
| 6,574,179 B2 | * | 6/2003 | Kaneko et al. ............. 720/720 |

FOREIGN PATENT DOCUMENTS

| | | |
|---|---|---|
| EP | 0 076 061 | 4/1983 |
| JP | 58-111149 | 7/1983 |
| JP | 58-182161 | 10/1983 |
| JP | 59-107449 | 6/1984 |
| JP | 5-189846 | 7/1993 |

* cited by examiner

*Primary Examiner*—Angel Castro
(74) *Attorney, Agent, or Firm*—Koda & Androlia

(57) ABSTRACT

An optical disk reproducing apparatus of a front loading type including an optical disk insertion assembly, which has a disk insertion port into which optical disks such as CDs and DVDs are inserted, and a disk transfer assembly which transfers the optical disks to the reproduction mechanism where the disks are reproduced. The optical disk insertion assembly and the disk transfer assembly are caused to slide forward so as to project out from the front surface of the reproducing apparatus and then caused to pivot to a position where the disk insertion port is outside the front surface of the reproducing apparatus so as to be directly observed when optical disks are inserted and removed.

11 Claims, 4 Drawing Sheets

OPTICAL DISK REPRODUCING APPARATUS AND REPRODUCING METHOD

BACKGROUND OF THE INVENTION

1. Field of the Invention

The present invention relates to an optical disk reproducing apparatus and an optical disk reproducing method.

2. Prior Art

In optical disk reproducing apparatuses that reproduce optical disks such as compact disks, DVDs (digital versatile disks), etc., upright type (upright disk) reproducing apparatuses have become increasingly popular as a result of demands for reduced thickness, saving of space and interior design properties. In such an upright disk reproducing apparatus, a reproduction is performed with the optical disk held so that the recorded surface of the optical disk is positioned perpendicular to the installation plane of the optical disk reproducing apparatus.

Furthermore, in such a conventional upright type disk reproducing apparatus, a disk insertion port is located typically in the upper surface of the apparatus main body. Thus, disks are inserted from directly above the apparatus main body and loaded into the reproduction position.

More specifically, an optical disk is inserted via the disk insertion port provided in the upper surface of the apparatus main body, and the optical disk that has thus been inserted via the disk insertion port is supported in a disk holder. The optical disk is then transferred to the position of the turntable by a disk loading means and chucked onto the turntable.

Such upright type disk reproducing apparatuses include a wall-mounted type. In such a wall-mounted type reproducing apparatus, the recorded surface of an optical disk is set perpendicular or parallel to the wall surface.

In the meantime, Japanese Patent Application Laid-Open (Kokai) No. 5-189846 discloses a cassette tape recorder; and in this cassette tape recorder, a cassette cover that opens and closes is disposed on the front surface, and cassettes are inserted by rotating and opening the cassette cover toward the front using a supporting shaft as an axis of rotation.

In the upright type disk reproducing apparatus in which the disk insertion port through which optical disks are inserted is disposed in the upper surface of the apparatus main body, the disk insertion port cannot be seen if the reproducing apparatus is mounted on a wall in a high position. Accordingly, when optical disks are inserted or removed, the recorded surface of the optical disk tends to come into contact with the disk insertion port wall surfaces, causing scratches on the recorded surface. Furthermore, since the disk insertion port is located in the upper surface of the apparatus, dust can easily enters into the apparatus through the disk insertion port, causing troubles in the apparatus.

In the structure of a cassette tape recorder described above, the cassette cover is opened toward the front of the main body of a cassette tape recorder each time a cassette is inserted or removed. In other words, a cassette tape is inserted via the open space created between the opened cassette cover and the cassette tape recorder main body, and the tape slides into a position where the tape is supported by a cassette tape supporting member disposed in the back of the cassette cover. When the cassette tape is to be removed, both side surfaces of the cassette tape supported by the cassette tape supporting member are held by the thumb and index finger of the user, and the cassette tape is pulled out.

When this mechanism of the cassette tape recorder is employed in an optical disk reproducing apparatus, if the opening angle of the cover member is set to be large so that the fingers and back of the hand of the user holding the optical disk can enter into the open space when an optical disk is inserted into the optical disk supporting member or when an optical disk is removed from the optical disk supporting member, dust tends to go into the interior of the apparatus through the open space and causes mechanical and other troubles. Furthermore, when the user removes an optical disk, the user must grip the optical disk from the side of the recorded surface of the optical disk. As a result, there is a danger that the fingers may inadvertently contact the recorded surface of the optical disk, resulting in fingerprints and scratches on the recorded surface of an optical disk.

SUMMARY OF THE INVENTION

Accordingly, the present solves the problems with the prior art optical disk reproducing apparatuses.

It is an object of the present invention to provide an optical disk reproducing apparatus and playback method in which optical disks can easily be set in the apparatus without causing scratches on the recorded surfaces of the optical disks.

It is another object of the present invention to provide an optical disk reproducing apparatus and reproducing method in which the reproducing apparatus is made thinner, and the insertion and removal of the optical disk is made easily, thus increasing the desire of users to purchase the apparatus.

The above objects are accomplished by a unique structure for an optical disk reproducing apparatus of the present invention, and it comprises:

a reproduction means which reproduces (the information recorded on) an optical disk, an optical disk insertion means disposed on the upper portion of the front surface of the main body of the optical disk reproducing apparatus, the optical disk insertion means having a disk insertion port in its upper surface into which the optical disk is inserted and opening and closing in the forward-rearward direction, and a optical disk transfer means which supports the optical disk that is inserted in the optical disk insertion means and transfers the optical disk to the reproduction means; and the reproducing apparatus further comprises a means that, when the optical disk is inserted or removed, causes the optical disk insertion means and the optical disk transfer means to pivot toward the front of the main body and causes the optical disk transfer means to move toward the top of the main body.

In the above structure, when the optical disk insertion means and the optical disk transfer means are caused to pivot, they pivot about an imaginary axis of rotation that is located further toward the front of the main body than a connection point of a connecting means installed between the lower portion of the optical disk transfer means and the chassis inside the main body.

The above objects are further accomplished by another unique structure for an optical disk reproducing apparatus of the present invention that comprises a reproduction means which reproduces (the information recorded on) an optical disk, an optical disk insertion means disposed on the upper portion of the front surface of the main body of the optical disk reproducing apparatus, the optical disk insertion means having a disk insertion port in its upper surface into which the optical disk is inserted and opening and closing in the forward-rearward direction, and a optical disk transfer means which supports the optical disk that is inserted in the optical disk insertion means and transfers the optical disk to the reproduction means; and the reproducing apparatus further comprises a means that, when an optical disk is inserted or removed, causes the optical disk insertion means and optical disk transfer means to move toward the front of the main body and then causes the optical disk insertion means to pivot toward the front of the main body and causes the optical disk transfer means to move toward the top of the main body.

DETAILED DESCRIPTION OF THE INVENTION

Embodiments of the present invention will be described below with reference to the accompanying drawings.

Figure 1:
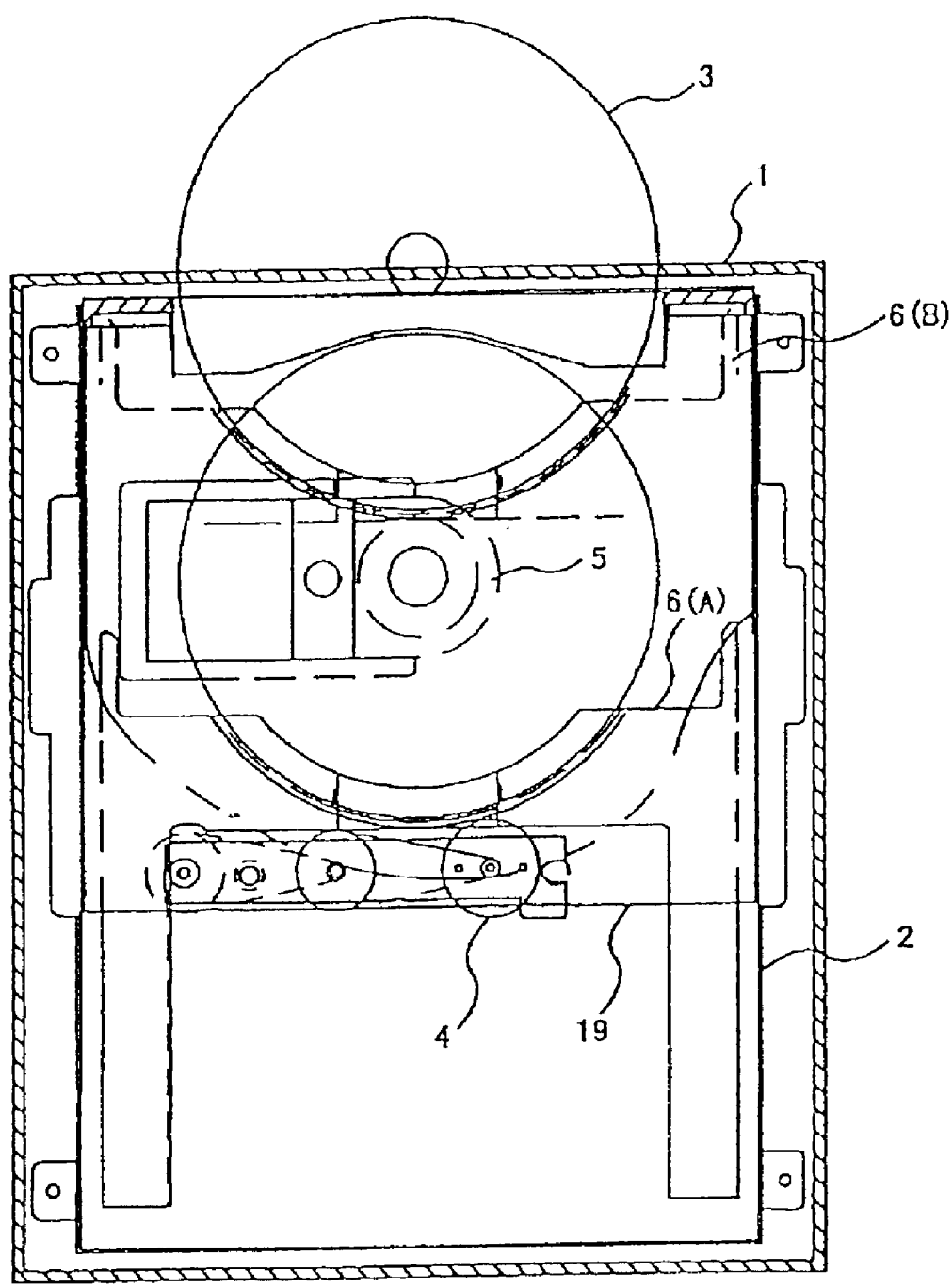
FIG. 1 is a front view of the loading mechanism of the optical disk reproducing apparatus according to the present invention.

FIG. 1 illustrates, in schematic terms, the loading mechanism of an optical disk reproducing apparatus according to the embodiment of the present invention. FIG. 1 shows that a disk 3 has been inserted from above the reproducing apparatus by an optical disk insertion means that includes a disk insertion port and then transferred to the reproduction position.

The optical disk reproducing apparatus is comprised of a main body 1, a disk holder 6 and a disk holder driving means 4. The disk holder 6, which is an optical disk transfer means in the present invention, transfers the disk 3 from its disk insertion port to a reproduction means 5. The reproduction means 5 includes, among other elements, an optical pick-up, a turntable and a spindle motor and reproduces the disk 3. The disk holder driving means 4 drives this disk holder 6. In other words, the disk holder 6 is caused by the driving force of the disk holder driving means 4 to move in the vertical direction between a disk insertion position (upper position in FIG. 1) and a disk reproduction position (lower position in FIG. 1).

Figure 2:
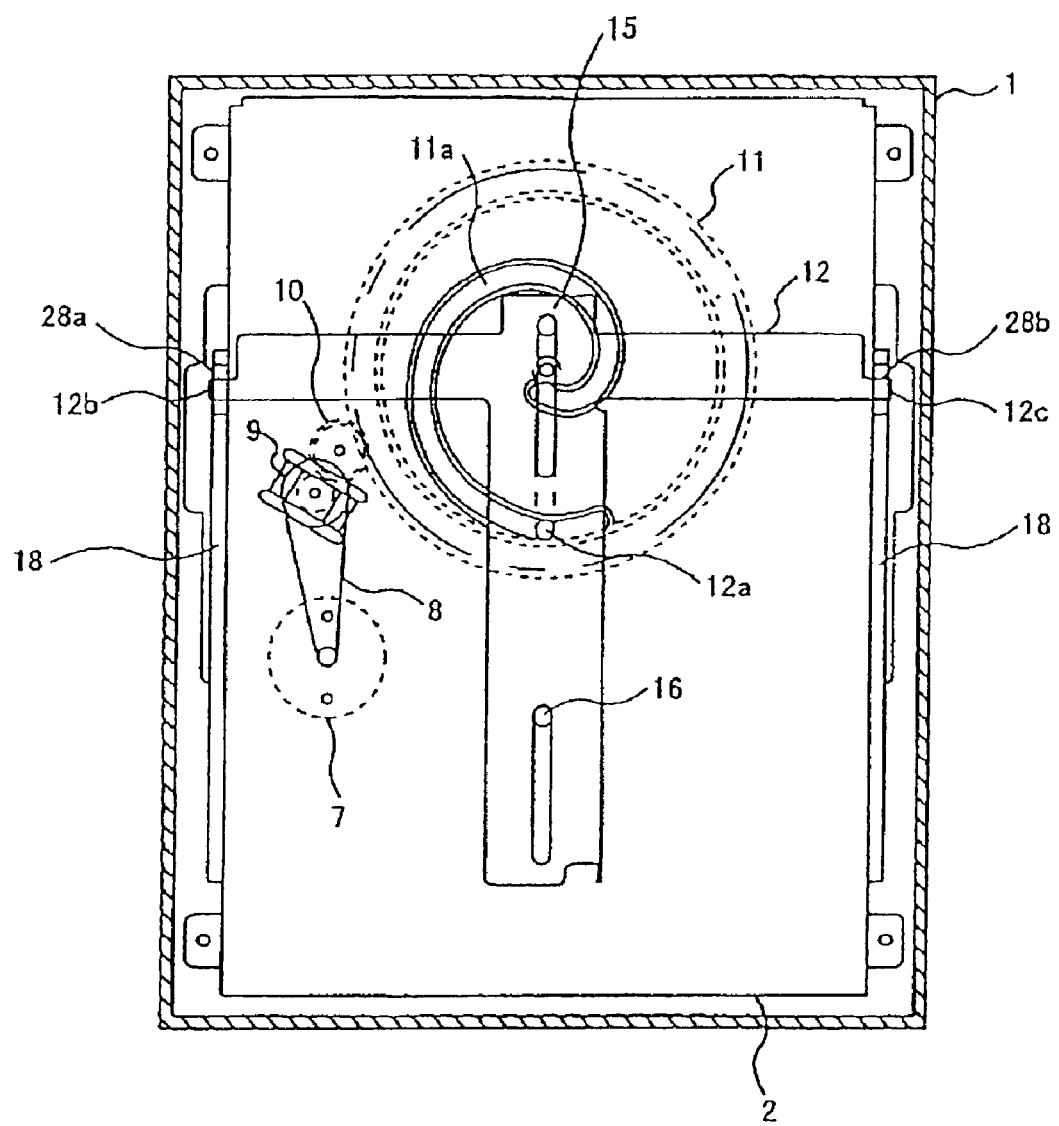
FIG. 2 is a rear view of the driving system for driving the moving means and the pivoting means thereof.

FIG. 2 shows the back of the main body 1 of the optical disk reproducing apparatus, illustrating schematically the arrangement of the driving system of the optical disk insertion means and the optical disk transfer means of the optical disk reproducing apparatus of one embodiment of the present invention. The driving system transmits the rotation of a motor 7 to a cam gear 11 via a belt 8, a pulley gear 9 and a gear 10. Thus, the cam gear 11 is turned by the rotation of the motor 7.

A slide plate 12 is engaged with guide pins 15 and 16 that are fastened to a chassis 2 inside the main body 1, and thus the slide plate 12 is provided so as to slide. A slide plate shaft 12a which is fastened to the slide plate 12 is engaged with a cam groove 11a of the cam gear 11, so that the slide plate 12 is caused to slide in the vertical direction along the guide pins 15 and 16 when the cam gear 11 is rotated.

To both side surfaces of the chassis 2, slide cams 18 are attached so as to slide in the vertical direction. Both end portions 12b and 12c of the slide plate 12 are respectively engaged with grooves 28a and 28b formed in the slide cams 18. Thus, when the slide plate 12 is moved in the vertical direction, the slide cams 18 are also moved in the vertical direction. In response to the vertical movement of the slide cams 18, the disk holder 6 is moved in the vertical direction between position A (the disk reproduction position) and position B (disk insertion position) in FIG. 1. The disk holder 6 is moved upward and downward while maintaining a position that is parallel to the front surface of a door 19 (described later).

Figure 3A:
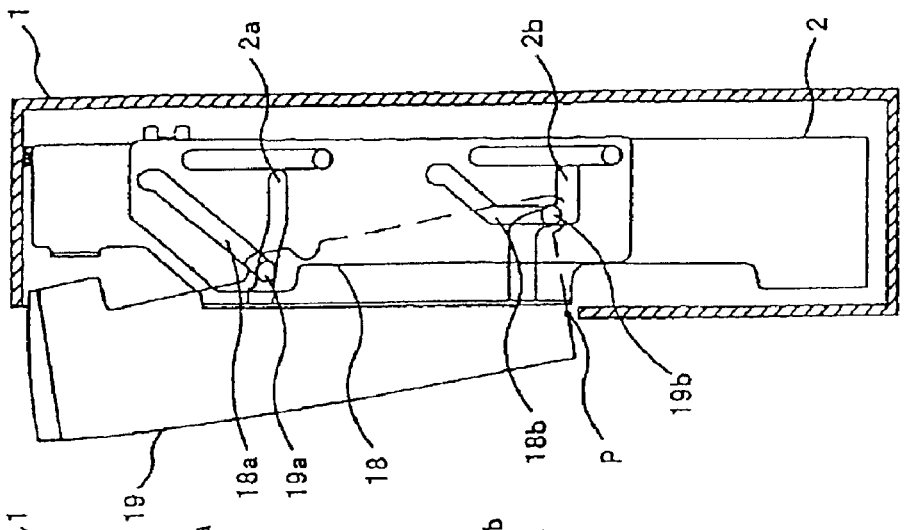
FIGS. 3(a), 3(b) and 3(c) are side views of the essential portion of the optical disk reproducing apparatus of the present invention in operation.
Figure 3B:
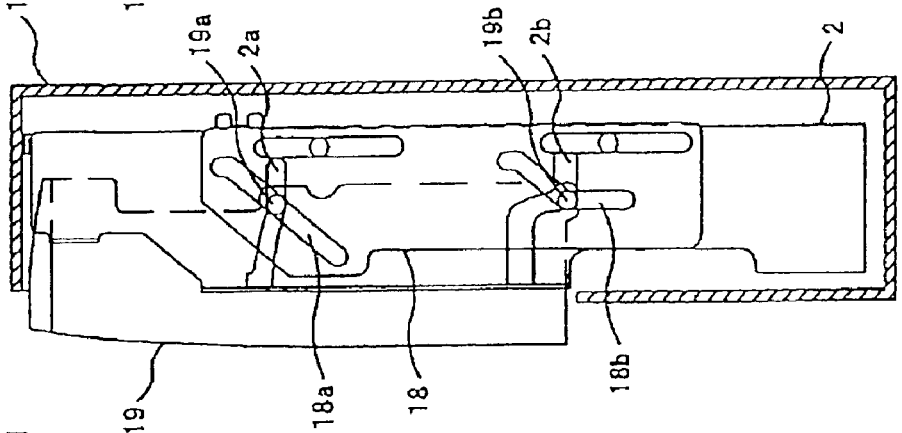
Figure 3C:
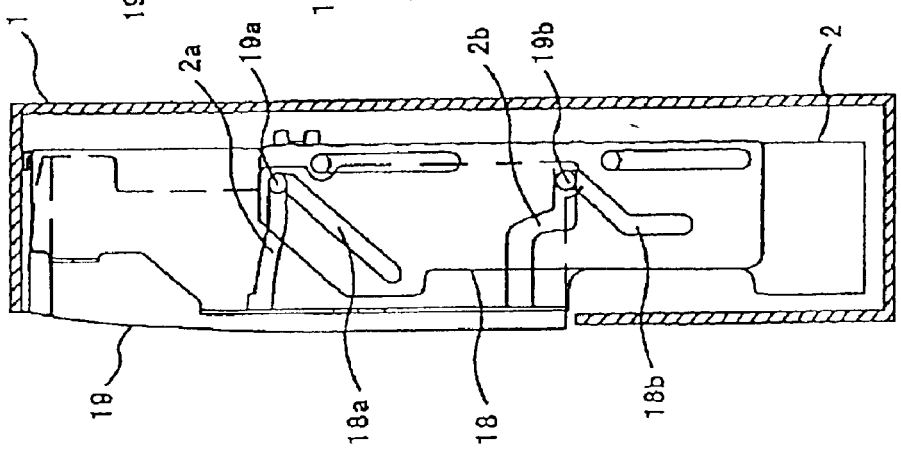

FIGS. 3(a), 3(b) and 3(c) illustrate the operation of an disk cover that is the door 19 equipped with the disk holder 6. The disk cover or the door 19 of the optical disk reproducing apparatus of one embodiment of the present invention is caused to move forward and pivot toward the front (which is on the left side of each of FIGS. 3(a), 3(b) and 3(c)) of the reproducing apparatus as a result of the vertical movement of the slide cams 18.

More specifically, in FIG. 3(a), the slide cams 18 (only one slide cam 18 is shown) are in the lowermost position of their vertical movement. In this lowermost position of the slide cams 18, the disk holder 6 is in position A in FIG. 1, and the optical disk 3 is in the position where it is reproduced by the reproduction means 5 (there is no rotation of the disk holder driving means 4). The door 19 is in the closed position in the apparatus main body 1. In this state, the front surface of the door 19 and the front surface of the apparatus main body 1 coincide or flush with each other as shown in FIG. 3(a).

Next, as shown in FIG. 3(b), when the slide cams 18 are moved to roughly a central position in the vertical direction (as a result of the rotation of the motor 7 shown in FIG. 2), door shafts 19a and 19b that are fastened to the door 19 are pushed by the cam grooves 18a and 18b of the slide cams 18; and the shafts 19a and 19b are guided along grooves 2a and 2b formed in the chassis 2. The cam groove 18a is formed obliquely with its rear end being higher than the front end, and the cam groove 18b is formed so as to have an oblique section in which the rear end is higher than the front end and a straight section that extends downward from the front end. As a result, the door 19 is slid or moved toward the front (the left side in FIG. 3(b)) of the reproducing apparatus and project out from the front surface of the reproducing apparatus. In this state as well, the disk holder 6 is in position A shown in FIG. 1 (there is no rotation of the disk holder driving means 4).

In FIG. 3(c), the motor 7 shown in FIG. 2 rotates. The slide cams 18 are thus moved further upward, the door shaft 19a is pushed toward the front of the main body 1 by the oblique cam groove 18a, and the door shaft 19b enters the straight section (which is in downward direction in FIG. 3(c)) of the cam groove 18b of the slide cam 18. As a result, the movement of the door shaft 19b (and thus the door 19) toward the front stops.

In the structure of the shown embodiment, the door 19 as a whole pivots about an imaginary axis of rotation (as if there were a pivot point). More specifically, when the optical disk insertion means (34) and the optical disk transfer means (6) are caused to pivot toward the front of the main body, these elements pivot about an imaginary axis of rotation P that is set further toward the front of the main body than the connection point of a connecting means installed between the lower portion of the optical disk transfer means (6) and the chassis 2 inside the main body. More specifically, the connecting means comprises the door shaft 19b provided in the lower portion of the optical disk transfer means 6 (or the door 19) and the grooves 2b of the chassis 2 with which the door shaft 19b is engaged and guided. During this operation (during the operation of FIGS. 3(b)→3(c)), the motor 7 shown in FIG. 1 rotates, and the disk holder 6 which is disposed in a position parallel to the front surface of the door 19 is moved from position A to position B in FIG. 1. As a result, the disk 3 held in the disk holder 6 is transferred in a state in which the disk 3 is inclined toward the front of the main body and is removed from the upper position of the main body 1 as shown in FIG. 1.

When the disk 3 is inserted into the reproducing apparatus and reproduced, an operation that is the opposite from the operation described above is performed.

Figure 4:
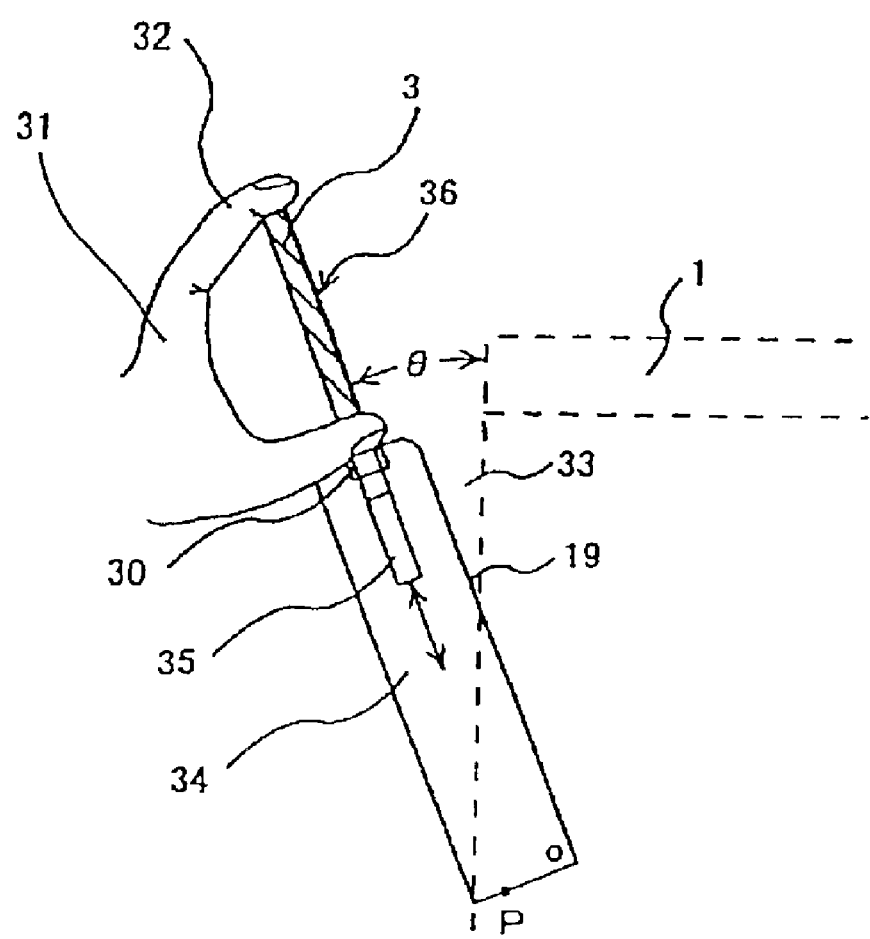
FIG. 4 is a diagram showing an example of operation of the optical disk reproducing apparatus of the present invention.

In FIG. 4, the door 19 (the optical disk insertion means 34) includes an optical disk transfer means 35 (the disk holder 6) and a disk insertion port 30. When an optical disk 3 is inserted into the optical disk insertion means 34 that is the door 19 from the disk insertion port 30, or when an optical disk 3 is removed from the disk insertion port 30, it is not necessary to put fingers 32 of hand 31 of the user gripping the optical disk 3 into the open space 33 (unlike the case to put a cassette tape into a cassette tape recorder). Accordingly, the opening angle θ of the door 19 for the open space can be set at a small angle. The opening angle θ is the angle formed by the front surface of the main body 1 and the optical disk recorded surface 36 of the optical disk 3.

Since the opening angle θ of the door 19 is small, dust can be avoided from entering into the reproducing apparatus, lowering the causes of troubles. Furthermore, the hand 31 of the user does not contact the optical disk recorded surface 36 of the optical disk 3; instead, as seen from FIG. 4, the optical disk 3 can be gripped from the printed label surface side and put in the disk insertion port 30 from above. Accordingly, no inadvertent contact of the fingers 32 with the optical disk recorded surface 36 of the optical disk 3 will occur, and fingerprints and scratches on the optical disk recorded surface 36 can be avoided.

Furthermore, since the angle θ is small, the reproducing apparatus can be made thinner and more compact. Moreover, the disk insertion port 30 can be visually checked when the optical disk 3 is inserted and removed, and the insertion and removal of the optical disk can be easily accomplished.

As seen from the above, in the present invention, the optical disk insertion means (the door 19) into which an optical disk is inserted tilts toward the front with its lower portion acting as an axis of rotation, and then, the optical disk transfer means (the disk holder 6) is moved up and down in an inclined state as indicated by arrow in FIG. 4. Accordingly, when an optical disk is inserted or removed, the recorded surface of the optical disk tends not to contact the disk insertion port, and scratching of the recorded surface can be avoided.

Furthermore, as seen from FIG. 4, the user can insert and remove an optical disk by gripping the optical disk from the printed label surface side of the optical disk. Accordingly, inadvertent fingerprints or scratches on the recorded surface of the optical disk can be avoided.

In addition, since optical disks are inserted and removed with the optical disk insertion means tilted toward the front, the disk insertion port can be visually checked even when the reproducing apparatus is located in a high position on a wall. The insertion and removal of the optical disk can be easily accomplished.

Furthermore, the optical disk insertion means into which an optical disk is inserted is moved forward from the main body, and then the optical disk insertion means pivots about an imaginary axis of rotation located in a position on the front surface of the main body. Accordingly, even if the optical disk playback apparatus has a greatly reduced thickness, the position of the front surface of the main body and the position of the front surface of the optical disk insertion means are flush with each other when the optical disk insertion means is closed. Moreover, it is possible to take such a structure that the gap between the lower portion of the optical disk insertion means and the front surface of the main body is small or no such gap is formed.

Since the disk insertion port enters the interior of the main body of the reproducing apparatus when the optical disk insertion means is closed, the entry of dust through the disk insertion port is prevented, and it is not necessary to provide an opening-and-closing means for the disk insertion port.

Furthermore, since the operation that opens and closes the optical disk insertion means is unique, it increases the desire of the user to purchase the apparatus.

What is claimed is:

1. An optical disk reproducing apparatus including a reproduction means that reproduces information recorded on an optical disk, wherein said reproducing apparatus is comprised of:

a mainbody, an optical disk insertion means disposed in a front surface of said main body and has a disk insertion port in an upper surface thereof into which an optical disk is inserted, and a disk holder which supports said optical disk that has been inserted in said optical disk insertion means mad transfers said optical disk to said reproduction means, and a disk insertion port opening means which moves said optical disk insertion means and said disk holder toward said front surface of said main body and a pivot motion that positions said disk insertion port outside of said main body by a sliding movement of said disk insertion port opening means in a direction parallel to the front surface of said main body.

2. The optical disk reproducing apparatus according to claim 1, wherein said optical disk insertion means includes a first shaft and a second shaft each provided in parallel to the front surface of the main body, and said disk insertion port opening means includes a pair of slide cams, the slide cams each being slidable in parallel to the front surface of the main body, and each of which includes a first groove having a first oblique section, the first shaft being located in the first groove, and a second groove having a second oblique section and a straight section, the second oblique section being shorter than the first oblique section and the second shaft being located in the second groove, wherein, in use, parallel sliding of said disk insertion means causes the movement of said optical disk insertion means and said disk holder toward said front surface of said main body, as a result of a sliding movement of the first and second shafts along the oblique sections of the first and second grooves, and then causes the pivot motion that positions said disk insertion port outside of said main body, as a result of a sliding movement of the first shaft along the oblique section of the first groove and movement of the second shaft along the straight section of the second of groove.

3. The optical disk reproducing apparatus according to claim 2, wherein the pivot motion is about an imaginary axis of rotation that is positioned further toward the front of said main body then a connection point of said optical disk insertion means and said disk insertion port opening means.

4. The optical disk reproducing apparatus according to claim 3 further comprising a drive means for moving the disk holder between a disk insertion position and a disk reproduction position.

5. The optical disk reproducing apparatus according to claim 2, further comprising a drive means for moving the disk holder between a disk insertion position and a disk reproduction position.

6. The optical disk reproducing apparatus according to claim 5 further comprising a slide plate for moving the disk holder and the disk insertion port opening means synchronously.

7. The optical disk reproducing apparatus according to claim 1, wherein the pivot motion is about an imaginary axis of rotation that is positioned further toward the front of said main body than a connection point of said optical disk insertion means and said disk insertion port opening means.

8. The optical disk reproducing apparatus according to claim 7 further comprising a drive means for moving the disk holder between a disk insertion position and a disk reproduction position.

9. The optical disk reproducing apparatus according to claim 1 further comprising a drive means for moving the disk holder between a disk insertion position and a disk reproduction position.

10. The optical disk reproducing apparatus according to claim 9 further comprising a slide plate for moving the disk holder and the disk insertion port opening means synchronously.

11. A reproducing method for an optical disk reproducing apparatus comprising:

a main body, an optical disk insertion means disposed in a front surface of said main body and has a disk insertion port in an upper surface thereof into which an optical disk is inserted, and a disk holder which supports said optical disk inserted in said optical disk insertion means and transfers said optical disk to said reproduction means, and a disk insertion port opening means for moving said optical disk insertion means and said disk holder toward said front surface of said main body and causing a pivot motion that positions said disk insertion port outside of said main body;

the reproducing method comprising the steps of:

moving said optical disk insertion means and said disk holder toward said front surface of said main body, by a sliding movement of said disk insertion port opening means in a direction parallel to the from surface of said main body;

pivoting said optical disk insertion means and said disk bolder about an imaginary axis of rotation that is positioned further toward the front of said main body than a connection point of said optical disk insertion means end said disk insertion port opening means, by a further sliding movement of said disk insertion port opening means in a direction parallel to the front surface of said main body, such that said optical disk insertion means and said disk holder are at a position in which a disk can be inserted in the disk insertion port.

\* \* \* \* \*